June 12, 1962   J. B. DICK   3,038,738
AUTOMOBILE IDLER ARM ASSEMBLY FOR FRONT END STABILIZING
Filed July 18, 1960
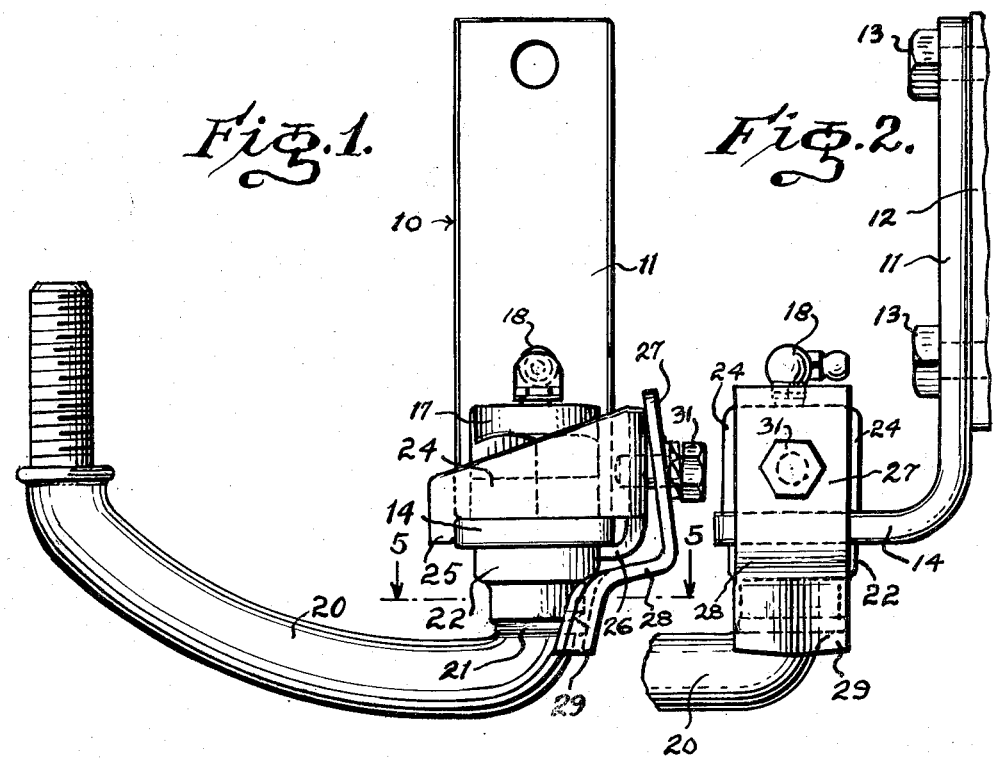
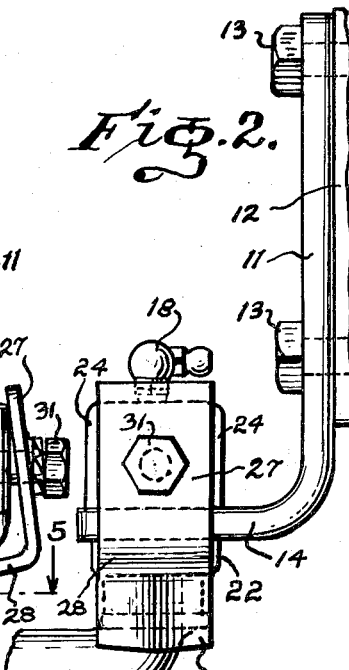
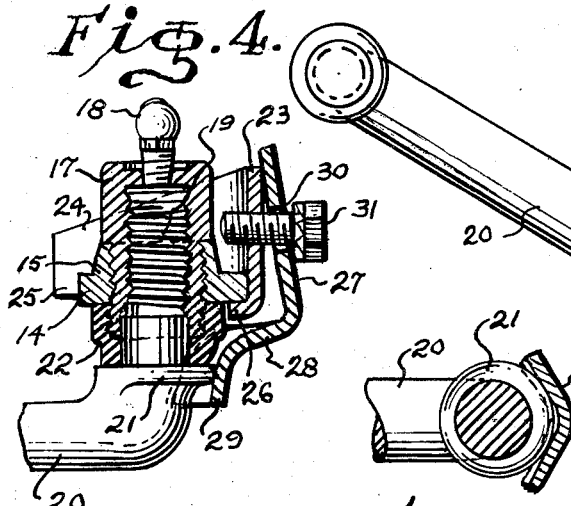
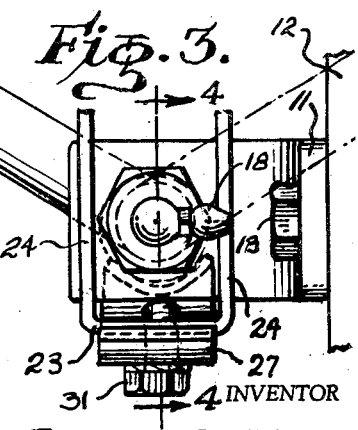
INVENTOR
James B. Dick
BY *Felix A. Russell*
ATTORNEY United States Patent Office 3,038,738
Patented June 12, 1962

3,038,738
AUTOMOBILE IDLER ARM ASSEMBLY FOR FRONT END STABILIZING
James B. Dick, 600 16th St. SW., Birmingham, Ala.
Filed July 18, 1960, Ser. No. 43,347
4 Claims. (Cl. 280—95)

The present invention relates to a front end stabilizer for automobiles and its consists in the combinations, constructions and arrangements of parts hereinafter described and claimed.

Generally there is provided a device of the general character set forth in my Patent No. 2,833,551 dated May 6, 1958, but which involves several improvements thereover. The present device consists of a bracket which may be quickly and easily attached to the conventional idler arm assembly and a dependent arm removably connected thereto in a novel manner and having a lower portion which is adapted to bear against the idler arm itself. The device is designed to eliminate looseness caused by wear in the idler arm assembly while at the same time providing a stabilizing effect in the front end assembly of the automobile in which it is utilized whereby to provide a stabilizing effect against road shock and weaving.

It is accordingly an object of the invention to provide a simplified front end stabilizer for automobiles.

Another object of the invention is to provide a device of the character set forth which is simple in construction, inexpensive to manufacture and yet effective and efficient in use.

A further object of the invention is to provide, in a device of the character set forth, a positive thrust of an idler arm against its bushing whereby to remove all looseness therebetween.

Another object of the invention is to provide a device of the character set forth which provides means for the removal of looseness between an idler arm and its bushing whereby to eliminate road shock and weave and thus unnecessary wear in the associated portions of an automobile including the adjacent tires.

A further object of the invention is the provision of a novel bracket forming a part of the invention.

A still further object of the invention is to provide a novel tensioning arm forming a part of the invention.

Still another object of the invention is to provide, in a device of the character set forth, novel means for mounting a tension arm upon a bracket, said arm and said bracket forming parts of the invention.

Other and further objects of the invention will become apparent from a reading of the following specification taken in conjunction with the drawing, in which:

FIGURE 1 is a side elevational view of an embodiment of the invention showing the same in operative position upon an idler arm assembly, FIGURE 2 is a front elevational view thereof, FIGURE 3 is a plan view of the device illustrated in FIGURES 1 and 2, FIGURE 4 is a fragmentary sectional view, partly in elevation, taken substantially along line 4—4 of FIGURE 3, and FIGURE 5 is a fragmentary sectional view taken substantially along line 5—5 of FIGURE 1.

Referring more particularly to the drawing, there is shown therein an L-shaped bracket 10 having a vertical arm 11 attached to the frame 12 of an automobile by means of bolts 13. The bracket 10 is provided with a lower arm 14 which extends in a horizontal direction.

The arm 14 of the bracket 10 is provided with an opening having an upstanding integrally formed seat 15 which is interiorly threaded for the reception of a vertically extending bushing 17 provided at its upper end with a grease fitting 18.

The bushing 17 is interiorly threaded for the reception therein of an inner portion 19 of an idler arm 20 which is provided with a collar or shoulder 21. A rubber grommet 22 is interposed between the shoulder 21 and the underside of the arm 14 and surrounds the lower portion of the bushing 17 and the adjacent portion of the idler arm 20.

The device embodying the present invention comprises a generally horizontally extending U-shaped bracket having a vertically extending apex portion 23 and a pair of parallel legs 24 each of which is provided with a vertically dependent integrally formed abutment 25 while the apex portion 23 is provided with an integrally formed dependent lip 26 curved in a direction toward the abutments 25.

A tension arm 27 has integrally formed with its lower end an inwardly directed web 28 to which is integrally connected a dependent socket 29 which latter is of substantial V-shape in horizontal cross sectional area, as indicated clearly in FIGURE 5.

The tension arm 27 is provided with a circular opening 30 through which a screw 31 extends, it being apparent from viewing FIGURE 4 that the opening 30 is substantially larger than the diameter of the screw 31. The screw 31 is threadably extended through the apex portion 23 of the bracket.

In use, in order to install the device of the present invention, it is only necessary to place the bracket in such manner that the tongue 26 underlies one side of the arm 14 while the abutments 25 are pressed against the opposite side thereof. In this position the legs 24 will straddle the bushing 17. Thereupon the tension arm 27 is attached to the apex portion 23 of the bracket for extending the screw 31 through the opening 30 into threaded engagement with the bight portion 23 of the bracket. In this position the V-shaped socket 29 will have two of its faces in abutting relation with the lip or shoulder 21. By tightening the screw 31, it will be apparent that a thrust is imparted against the idler arm whereby positive engagement of the portion 19 with the threads in the bushing 17 will take place thus leaving the bushing complete freedom of movement while at the same time removing all looseness and providing the proper amount of tension to eliminate road shock and weave and producing a quiet stabilized steering condition free from annoying driving disturbances.

It will also be apparent that by providing the hole 30 with a diameter slightly larger than the diameter of the screw 31, that the tension arm 27 is free to swing, within limits, upon the screw 31 thus allowing the tension arm to be adjusted in abutting relation with the shoulder 21 though the size of the latter may vary.

While but one form of the invention has been shown and described herein, it will be readily apparent to those skilled in the art that many minor modifications may be made without departing from the spirit of the invention or the scope of the appended claims.

What is claimed is:

1. A device of the character described comprising, in combination with an idler arm having a vertically extending threaded end portion, an attaching bracket having an apertured horizontal arm, a bushing vertically affixed and extending through said horizontal arm and threadably receiving through its lower end said threaded end portion of said idler arm, said end portion of said idler arm having an integrally formed shoulder, the provision of a stabilizer comprising a U-shaped bracket, an abutment dependent from each leg of said U-shaped bracket and adapted to abut against one side of said horizontal arm, a curved tongue dependent from the bight portion of said U-shaped bracket, said tongue extending in a direction toward said abutments and adapted to encompass the other side of said horizontal arm, a tension lever rockably attached to the bight portion of said U-shaped bracket and having a dependent portion bearing against said shoulder.

2. A device as defined in claim 1 wherein said dependent portion of said tension lever is V-shaped in horizontal cross sectional area whereby it presents two bearing surfaces against said shoulder.

3. A device as defined in claim 2 wherein a screw extends loosely through the upper end portion of the tension lever and extends threadably through the bight portion of said U-shaped bracket.

4. A device as defined in claim 1 wherein a screw extends loosely through the upper end portion of the tension lever and extends threadably through the bight portion of said U-shaped bracket.

References Cited in the file of this patent
UNITED STATES PATENTS

| | | |
|---|---|---|
| 2,833,551 | Dick | May 6, 1958 |
| 2,841,412 | Mineck | July 1, 1958 |
| 2,844,382 | Dick | July 22, 1958 |